United States Patent
Blumenfeld et al.

(10) Patent No.: US 7,373,658 B1
(45) Date of Patent: May 13, 2008

(54) ELECTRONIC LOOSE-LEAF REMOTE CONTROL FOR ENABLING ACCESS TO CONTENT FROM A MEDIA PLAYER

(75) Inventors: Steven M. Blumenfeld, Lafayette, CA (US); William J. Raduchel, Great Falls, VA (US)

(73) Assignee: AOL LLC, Dulles, VA (US)

( * ) Notice: Subject to any disclaimer, the term of this patent is extended or adjusted under 35 U.S.C. 154(b) by 739 days.

(21) Appl. No.: 10/429,963

(22) Filed: May 6, 2003

Related U.S. Application Data

(63) Continuation-in-part of application No. 10/412,682, filed on Apr. 14, 2003, which is a continuation-in-part of application No. 10/334,144, filed on Dec. 31, 2002, now abandoned.

(60) Provisional application No. 60/421,051, filed on Oct. 25, 2002.

(51) Int. Cl.
H04L 9/32 (2006.01)
G06F 17/30 (2006.01)
G06F 21/00 (2006.01)

(52) U.S. Cl. .............................. 726/9; 726/20; 713/185

(58) Field of Classification Search ...................... None
See application file for complete search history.

(56) References Cited

U.S. PATENT DOCUMENTS

| | | | |
|---|---|---|---|
| 5,892,900 A | | 4/1999 | Ginter et al. |
| 5,898,830 A | * | 4/1999 | Wesinger et al. ............. 726/15 |
| 6,052,788 A | * | 4/2000 | Wesinger et al. ............. 726/11 |
| 6,236,971 B1 | | 5/2001 | Stefik et al. |
| 6,301,660 B1 | | 10/2001 | Benson |
| 6,314,409 B2 | | 11/2001 | Schneck et al. |
| 6,330,549 B1 | | 12/2001 | Merkle |
| 6,351,813 B1 | | 2/2002 | Mooney et al. |
| 6,385,729 B1 | * | 5/2002 | DiGiorgio et al. ............. 726/9 |
| 6,434,535 B1 | | 8/2002 | Kupka et al. |
| 6,503,147 B1 | | 1/2003 | Stockdale et al. |
| 6,513,121 B1 | | 1/2003 | Serkowski |
| 6,519,700 B1 | | 2/2003 | Ram et al. |
| 6,523,119 B2 | | 2/2003 | Pavlin et al. |
| 6,542,358 B1 | | 4/2003 | Kunz et al. |
| 6,547,146 B1 | | 4/2003 | Meksavan et al. |
| 6,550,011 B1 | | 4/2003 | Sims, III |
| 6,557,104 B2 | | 4/2003 | Vu et al. |
| 6,567,794 B1 | | 5/2003 | Cordery et al. |
| 6,577,561 B2 | | 6/2003 | Pirot et al. |
| 6,606,707 B1 | | 8/2003 | Hirota et al. |
| 6,651,169 B1 | | 11/2003 | Benson et al. |
| 6,651,175 B1 | | 11/2003 | Slama |
| 6,658,000 B1 | | 12/2003 | Raciborski et al. |
| 6,658,585 B1 | | 12/2003 | Levi |

(Continued)

OTHER PUBLICATIONS

"Out of Band Methodology", Jun. 28, 2004, StrikeForce Technologies Inc., p. 1-5.*

(Continued)

Primary Examiner—Christopher Revak
(74) Attorney, Agent, or Firm—Fish & Richardson P.C.

(57) ABSTRACT

Access to content is enabled by reading an out-of-band token. A handler relating to information in the out-of-band token may be identified. The handler may be exchanged with a remote media player to enable access to content related to the out-of-band token.

27 Claims, 10 Drawing Sheets

U.S. PATENT DOCUMENTS

| | | |
|---|---|---|
| 6,658,586 B1 | 12/2003 | Levi |
| 6,662,228 B1 | 12/2003 | Limsico |
| 6,665,799 B1 | 12/2003 | Slama |
| 6,671,808 B1 | 12/2003 | Abbott et al. |
| 6,674,259 B1 | 1/2004 | Norman et al. |
| 6,678,665 B1 | 1/2004 | Benson et al. |
| 6,708,157 B2 | 3/2004 | Stefik et al. |
| 6,714,921 B2 | 3/2004 | Stefik et al. |
| 6,751,738 B2 * | 6/2004 | Wesinger, Jr. et al. ........ 726/14 |
| 6,804,783 B1 * | 10/2004 | Wesinger et al. ............. 726/11 |
| 7,028,336 B2 * | 4/2006 | Wesinger et al. ............. 726/11 |
| 7,249,376 B2 * | 7/2007 | Wesinger et al. ............. 726/11 |
| 7,249,378 B2 | 7/2007 | Wesigner et al. |
| 2002/0043557 A1 * | 4/2002 | Mizoguchi et al. ......... 235/375 |
| 2003/0012382 A1 * | 1/2003 | Ferchichi et al. ........... 380/270 |
| 2003/0028814 A1 | 2/2003 | Carta et al. |
| 2004/0230797 A1 | 11/2004 | Ofek et al. |
| 2004/0252832 A1 | 12/2004 | Domjan et al. |
| 2005/0283839 A1 | 12/2005 | Cowburn |
| 2006/0030985 A1 | 2/2006 | Lawida et al. |

OTHER PUBLICATIONS

"C.O.B.A.S. Centralized Out-of-Band Authentication System", Sep. 8-9, 2003, QT Worldtel Inc., Southeast Europe Cybersecurity Conference, p. 1-14.*

* cited by examiner

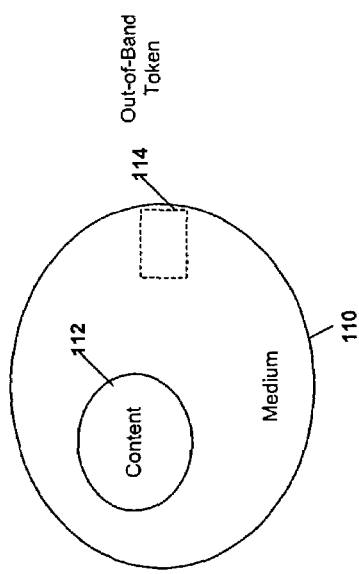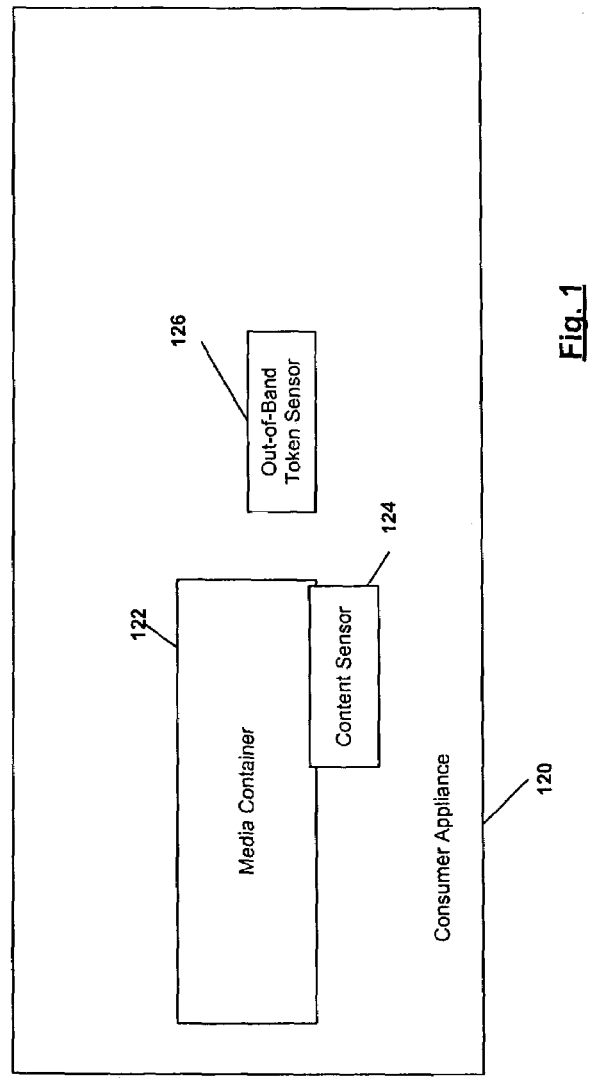
Fig. 1

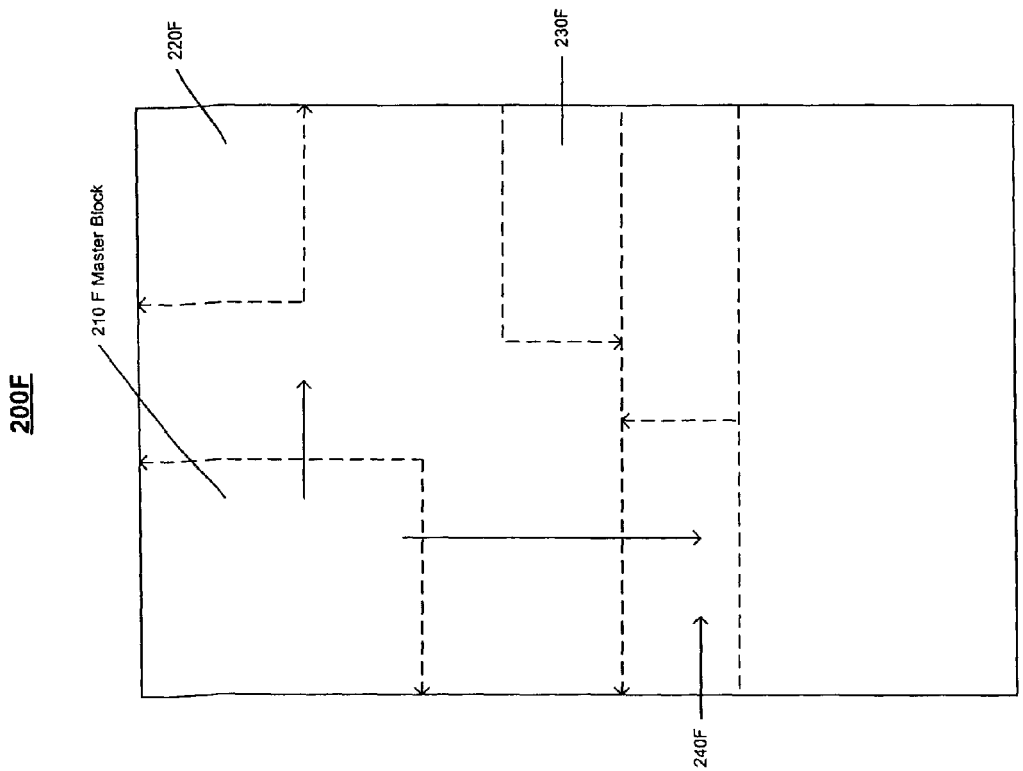
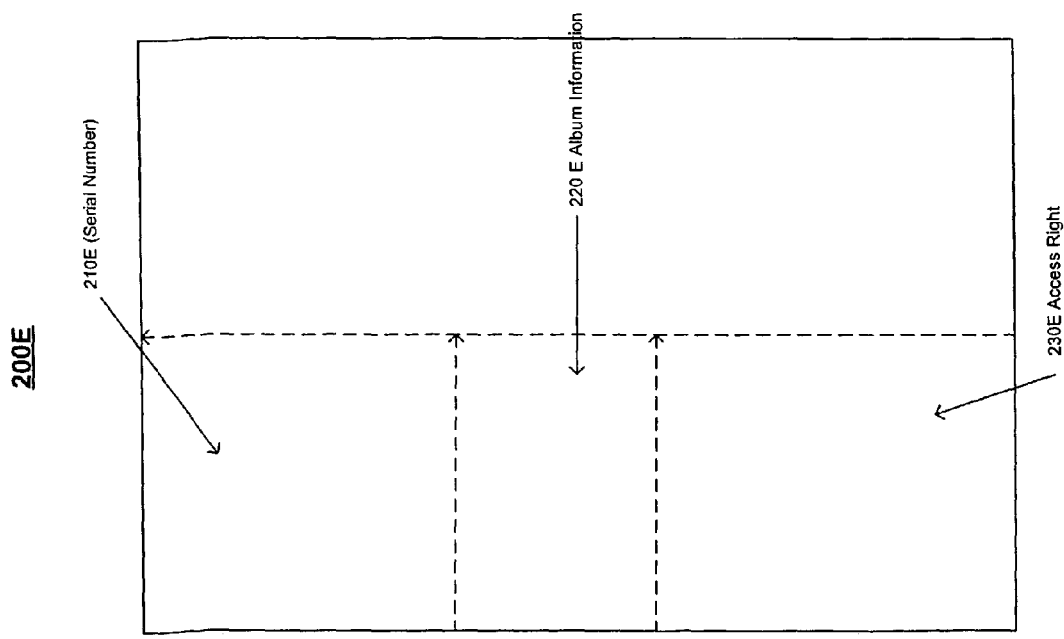
Fig. 2F
Fig. 2E

ELECTRONIC LOOSE-LEAF REMOTE CONTROL FOR ENABLING ACCESS TO CONTENT FROM A MEDIA PLAYER

CROSS-REFERENCE TO RELATED APPLICATIONS

This application claims priority to U.S. Provisional Application No. 60/421,051, filed Oct. 25, 2002, and titled "Out-of-band Tokens for Digital Rights Management." This application is a continuation-in-part for U.S. application Ser. No. 10/334,144, filed Dec. 31, 2002, which is now abandoned, and titled "Out-of-band Tokens for Rights Access," which is a continuation-in-part of U.S. application Ser. Nos. 10/334,144, filed Dec. 31, 2002 and 10/412,682, filed Apr. 14, 2003. These applications are incorporated by reference.

TECHNICAL FIELD

This document relates to remote control systems.

BACKGROUND

The emergence of new technologies has created more channels for dissemination of content to which access is not necessarily authorized. Moreover, with digital copying tools and Internet-based distribution programs, content that has been accessed without authorization may be digitally copied many times without distortion.

SUMMARY

In one general aspect, access to content may be enabled by reading an out-of-band. A handler in the out-of-band token may be identified, with the handler relating to information in the out-of-band token. The handler may be exchanged with a remote media player to enable access to content related to the out-of-band token.

Implementations may include one or more of the following features. For example, the out-of-band token may be secured when the out-of-band token is removed from a token reader. Securing the out-of-band token may include doing so in an automated manner.

Perceivable output related to the electronic content may be generated. Generating perceivable output may include enabling a consumer to operate the media player using the system reading the out-of-band token and/or generating a reconfigurable display that corresponds to the out-of-band token. Generating perceivable output also may include generating a reconfigurable display related to an access right associated with the out-of-band token. The out-of-band token may be associated with a particular system reading the out-of-band token, a particular media player, or a particular piece of content.

Implementations may include systems configured to achieve these features and techniques for doing so. Other features will be apparent from the following description, including the drawings, and the claims.

DESCRIPTION OF DRAWINGS

FIG. 1 is a block diagram of a content access system.

FIG. 2E illustrates another exemplary out-of-band token.

FIG. 2F illustrates how a master location may dynamically generate an out-of-band token.

Figure 2A:
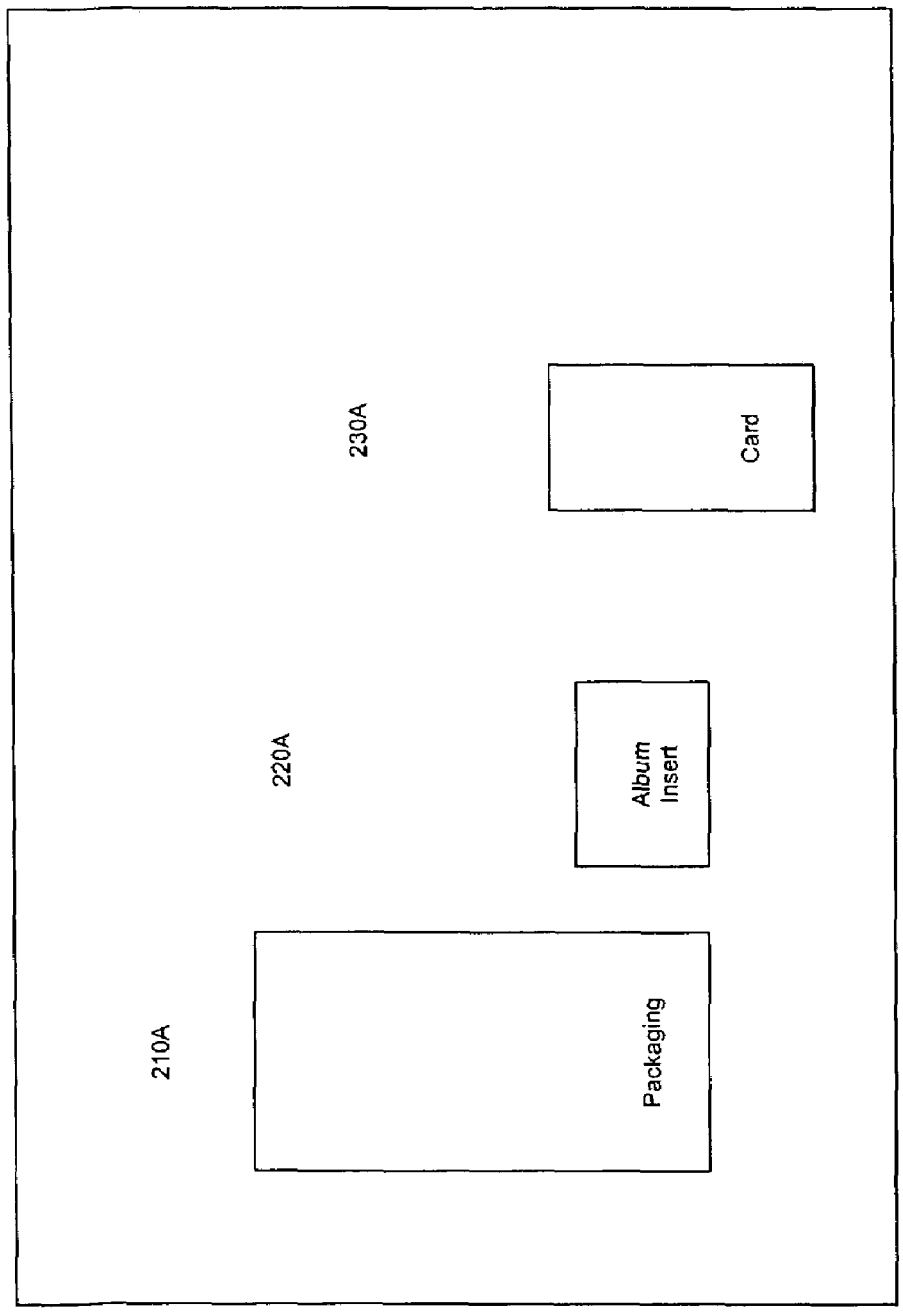
FIG. 2A is a block diagram of devices that may be included in a distribution of a medium that may be used as an out-of-band token.

Like reference symbols in the various drawings indicate like elements. For brevity, several elements in the figures described below are represented as monolithic entities. However, as would be understood by one skilled in the art, these elements each may include numerous interconnected computers and components designed to perform a set of specified operations and/or dedicated to a particular geographical region. Similarly, illustrated processes may each include numerous subprocesses.

DETAILED DESCRIPTION

For illustrative purposes, FIGS. 1-8 describe a content access system for administering access to content through an electronic loose-leaf remote control. Generally, a token may be used to access content in a media player. The token may be inserted in an electronic loose-leaf configured to act as a remote control. The electronic loose-leaf then may interface with a media player to access one or more selections in the content. Before satisfying a request for content, the media player may use the electronic loose-leaf to read an out-of-band token (e.g., a promotional card included in an album) associated with the content. The media player, working in conjunction with the electronic loose-leaf, may determine an access right for the content based on the out-of-band token, and may enable access to the content in accordance with the determined access right.

Generally, the token describes digital rights management information that is used to identify access rights appropriate for the content. The access rights may vary based on the user, individually or categorically. An out-of-band token resides in a different channel than the content. The channels for the content and the token may be of consistent type (e.g., both optical) or different type (e.g., magnetic and optical). Thus, the electronic medium and the out-of-band token generally are detected using different sensors. For example, an out-of-band token for content recorded on a compact disk may include a holographic image displayed on the compact disk surface or cover.

The following simplified example is provided to illustrate use of an optical token on the case of an optical disk. In this example, a consumer inserts the optical disk into a disk player and inserts the optical disk case underneath an optical sensor in an electronic loose-leaf that is configured to discern access rights from context indicia embedded in or otherwise attainable from the optical disk case. Using the discerned access rights, the disk player determines whether the requested access is available and acts appropriately to enable or deny access (e.g., to play a song from the optical disk upon determining that the access rights allow such access).

FIG. 1 illustrates one implementation of a content access system 100 configured to administer access to content. The content access system 100 includes a medium 110 and a consumer appliance 120. The medium 110 includes content 112 (e.g., electronic or optical content) and an out-of-band token 114 associated with the content 112. The consumer appliance 120 includes a media container 122, a content sensor 124, and an out-of-band token sensor 126. The consumer appliance 120 may use the out-of-band token sensor 126 to read the out-of-band token 114, and may use the results of the reading to determine access rights to the content 112.

Generally, the medium 110 includes one or more devices configured to store content. The medium 110 may be embodied or included in a portable dedicated storage device, such as a memory/storage key or a floppy, compact, optical (e.g., CD ("compact disc"), DVD ("digital video disk"), HD-DVD ("high definition digital video disk")), digital, versatile, or MP3 disk. Alternatively, the medium 110 may be included or integrated in another system, which may or may not be portable or remote. For example, the medium 110 may include a hard drive of a consumer appliance 120, which may be used as an access-regulated jukebox to enable multiple selections of content depending on the configuration of the consumer appliance 120 and the access rights for a user accessing the consumer appliance 120. Alternatively, the medium 110 may reside on a remote system that is accessible to a consumer appliance 120 and that is operated by a third party, such as a record label.

Generally, the content resides in the channel for which the medium was designed. For example, in an optical disk medium, the content (e.g., a song) is stored as optical binary bits. These optical bits may be read by targeting a location in the optical disk with an optical transceiver and determining whether each of a series of optical bits is logically set to a '1' or '0'. Alternatively, if the medium 110 includes a compact flash card or a hard disk drive, the content 112 may reside in the memory in the compact flash card or on the magnetic platters of the hard disk drive.

The out-of-band token 114 is an authentication system configured to establish access controls or permissions for the content. The out-of-band token 114 and the content 112 reside in different frequencies, channels, media, physical structures, or formats such that the out-of-band token 114 is not read by the sensor used to read the content 112. For example, when using different frequencies' to achieve independence among content 112 and token 114, the content 112 may be read at a first wavelength and the out-of-band token 114 may be read at a second wavelength.

The out-of-band token 114 may be configured so that a consumer may be unable to recreate the out-of-band token 114. For example, a consumer may be able to distribute the content, for example, using file sharing protocols and optical disk writing technologies. However, a mint with equipment that is not accessible to consumers may be necessary to write the out-of-band token 114. The mint may include an industrial printer or a hologram writer. The mint also may be configured to associate a particular instance of the medium 110 or the content 112 with the out-of-band token 114 being fabricated. For example, the mint may associate a serial number for the medium 110 or the content 112 with the out-of-band token 114. Thus, an out-of-band token 114 associated with a first medium 110/piece of content 112 may not be used with a second medium 110/piece of content 112.

The out-of-band token 114 need not be distributed with the medium 110. For example, a content provider may electronically distribute selections of content to one or more storage locations. At a later time, a consumer may use the out-of-band token 114 to unlock the content, which has been electronically distributed and is already residing in, for example, an electronic jukebox.

The out-of-band token 114 may describe the instances of content 112 that may be accessed. For example, the out-of-band token may include a serial number printed on the surface of a disk. This serial number also may be stored in the content on the optical disk.

The out-of-band token 114 may be a passive device that is not required to be electronically interrogated. In contrast, an active out-of-band token 114 may include an electronic or magnetic interface that is interrogated electronically. For example, the out-of-band token 114 may include a disk cover that is read by an optical "eye" configured to read disk covers. One example of an active out-of-band token 114 is an electronic key that is inserted into a key reader. The key reader may electronically probe key logic and/or memory to make an access control determination.

The consumer appliance 120 includes a medium container 122, a content sensor 124, and an out-of-band token sensor 126. Generally, as described in greater detail with respect to FIG. 3, the consumer appliance 120 is configured to (1) receive and secure medium 110 using medium container 122, (2) read the out-of-band token 114 using the out-of-band token sensor 126, (3) determine access rights based on the token 114, and (4) read the desired content from the medium 110 using the content sensor 124 (e.g., an optical or magnetic head) if sufficient rights exist.

The consumer appliance 120 also may include and run one or more software applications. For example, the consumer appliance 120 may run a software application configured to administer a digital rights management program. The digital rights management program may be used to determine an access right for the content. Other software applications on the consumer appliance 120 may include a software application configured to display content information (e.g., a cover, lyrics, artist information, and/or purchasing information for the content). Although the consumer appliance 120 may relate to other consumer appliances, such as a CD player and/or a DVD player, the consumer appliance 120 also may relate to more flexible electronic equipment, such as a personal computer. For example, a computer may be configured as a stereo system that runs a general-purpose operating system with one or more media applications performed by a general operating system and a general-purpose processor. Additionally, the computer may be configured to respond to controls such as those typically found on a stereo system (e.g., a volume control dial).

The media container 122 is a device configured to receive and support a medium 110. For example, the media container 122 may include a tray configured to hold an optical disk and retrieve the optical disk into the consumer appliance 120 to play the content on the optical disk. Alternatively, the medium container 122 may include a slot, a pressed-on lid used to insert an optical disk, a container configured to receive various forms of electronic storage (e.g., compact flash, non-volatile memory), or some other mechanism capable of receiving and supporting a medium 110.

The content sensor 124 includes a detector configured to read content 112 residing in a medium 110 that has been placed in or that is supported by the media container 122. The content sensor 122 may include an optical transceiver configured to read content written to or otherwise stored by an optical medium 110, such as an optical disk. Another example of the content sensor 124 may include a memory reader configured to read electronic and/or magnetic memories.

The content sensor 124 may be integrated with the media container 122. For example, the content sensor 124 may be configured to read an optical disk that has been placed in a tray configured to secure the optical disk. The tray may retrieve the optical disk, rotate the optical disk, and control the location of the content sensor to read an appropriate portion of the content, such as, for example, a particular track.

The out-of-band token sensor 126 includes a device configured to read an out-of-band token 114 associated with content 112. The token 114 then may be used to determine an access right for the content 112. Using an out-of-band token sensor 126, it is possible to detect or otherwise identify, infer or resolve access rights based on information that does not actually reside within the content 112 in the medium 110 itself. That is, to determine the access rights appropriate for the content 112 or the medium 110 itself, out-of-band sensor 126 may be used to access another source of information that resides in the medium 110 or a channel that is distinct from the medium 110 or the channel of information used to store the content 112.

Furthermore, the out-of-band token sensor 126 may be configured to read a token 114 that is physically located proximate to or even sharing the same physical structure as the content 112. For example, the out-of-band token sensor 126 may read an out-of-band token 114 residing as an image printed the surface of an optical disk. Thus, to access the content 112, a first optical detection device (e.g., content sensor 124) may be used to play a CD, while a different sensor (e.g., out-of-band token sensor 126) is used to access out-of-band information residing on the label of the CD.

The out-of-band token sensor 126 may include a device distinct from the content sensor 124, or the out-of-band token sensor 126 may be co-located with the content sensor 124. For example, the out-of-band token sensor 126 may be configured to read the label affixed to the surface of a medium 110 that is inserted in the media container 122. By way of contrast, the out-of-band token sensor 126 in another example may not be co-located with the content sensor 124. For instance, the out-of-band token sensor 126 may read a label on the optical disk that is swiped under an external out-of-band token sensor 126 before the optical disk is placed in a tray acting as the media container 122. In another configuration, the out-of-band token sensor 126 may be configured to read out-of-band tokens 114 that are not co-located with the medium 110. For example, the medium 110 may be inserted in the media container 122, and the cover of a case for the medium 110 may be swiped or placed before an out-of-band token sensor 126 that is configured to read one or more portions of the case cover to determine the access rights for the content.

The out-of-band token 114 may be stored on the medium 110 (e.g., on the label on the surface of the optical disk) as a hologram that is written onto the optical disk but that resides in a different band than the content itself. Furthermore, the hologram itself need not be stored as digital information. For example, the hologram may comprise an analog image that may be scanned by the out-of-band token sensor 126.

Referring to FIG. 2A, one or more items may be distributed as packaging 200A for medium 110 and used as an out-of-band token 114. When configured to act as an out-of-band token 114, an item may be read by the out-of-band token sensor 126 described with respect to FIG. 1. Generally, the systems in the packaging 200A may be distributed with the medium 110.

Specifically, the medium 110 described by FIG. 1 may be distributed with packaging 210A, an insert 220A, and/or a card 230A. For example, DVD disk packaging 200A may include a paper insert 220A that is descriptive of the DVD tracks, the credits and the lyrics. The insert 220A may include a guide to lyrics that is being distributed with a CD. Additionally, a card 230A with a high quality image may be distributed. The card 230A may be used to describe the content on the medium itself (e.g., track descriptions). The card may be inserted in a jacket of the medium and collected by an owner.

Typically, in addition to the items shown by FIG. 2A, the packaging 210A includes one or more devices or components configured to protect the medium from being damaged. The packaging also may include one or more theft deterrent devices and/or logistics management components configured to manage the medium itself. For example, the packaging may include a bar code and/or a RF ("Radio Frequency") identification sensor that may be used in support of inventory and security functions. These items also may be used as out-of-band tokens.

The medium may include an optical disk with one or more pieces of content available for use. This content may be digitally secured (e.g., encrypted). Alternatively, the medium may include content that is not secure and instead relies on a consumer appliance 120 to administer a digital rights management scheme.

Figure 2D:
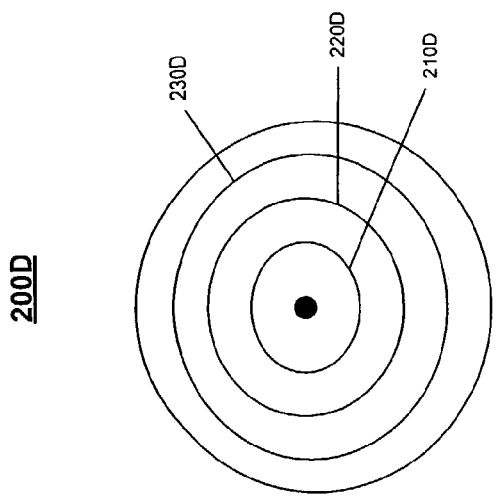
FIGS. 2C and 2D together illustrate a medium to show how information appearing on the surface of the medium may generate an out-of-band token when the medium shown in FIG. 2C is spun.
Figure 2C:
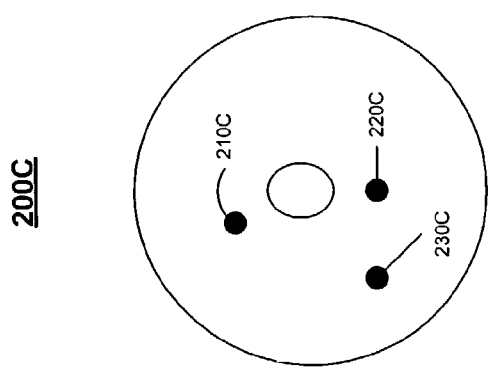
Figure 2B:
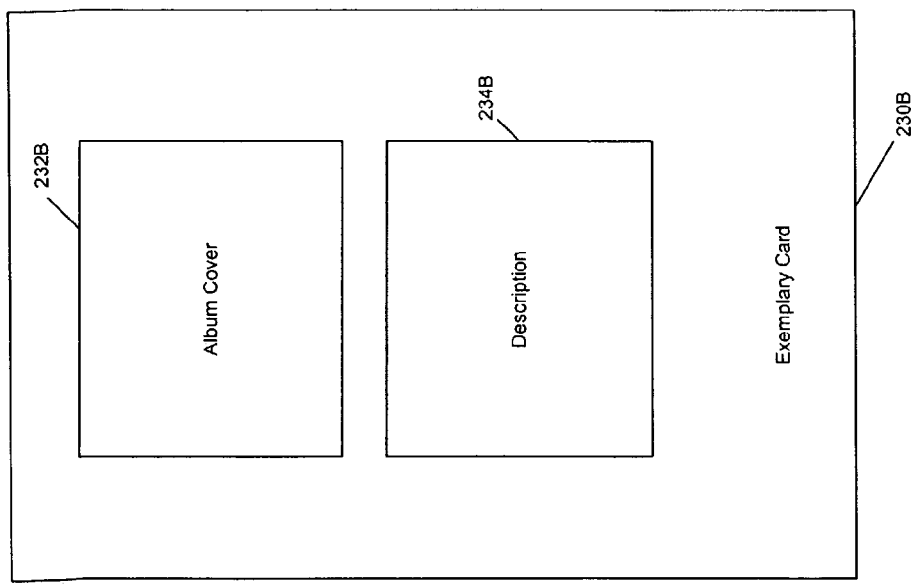
FIG. 2B is a block diagram of a card that may be used to signal access rights.

Referring to FIG. 2B, an exemplary card 230B may be configured to act as an out-of-band token. Generally, the card 230B relates to the card 230A described previously in the context of packaging 200A in FIG. 2A. However, card 230B includes a cover image 232B and a description 234B and may have an image used to determine access rights. Although information in the image may not be discernable to the naked eye of an observer, the out-of-band token sensor 126 may detect information residing in the image and use that information to determine the user access rights. For example, user access rights may be specified by a certain color or pattern appearing in a portion of the cover image 232B. Card 230B also illustrates how the access rights may be incorporated into a card 230B that may be useful to the user as a medium identifier.

Referring to FIGS. 2C and 2D, an exemplary medium 200C illustrates how an out-of-band token may be generated from information appearing on the surface of a medium 110. The out-of-band token sensor 126 may be configured to read token information that is not generated until the medium 110 itself is processed. For example, a pattern of information may be written on the label on an optical disk. As the label is spun, a pattern may be generated on the surface of the optical disk, this pattern may be read to determine the access rights for the content. For example, the information may be encoded in areas 210C, 220C, and 230C of the medium 200C. As medium 200C is spun, an out-of-band token 200D may be generated and read from the surface of the medium 200C, as shown by the exemplary pattern of rings illustrated by FIG. 2D. When spun, the images 210C, 220C, and 230C generate rings 210D, 220D, and 230D, which may be used to determine the access rights.

Referring to FIG. 2E, an image 200E may be used as an out-of-band token 114 with encoded access rights. Image 200E includes a first portion configured to encode an identifier (e.g., a serial number 210E), a second different portion configured to describe a second identifier (e.g., medium information 220E), and a third portion configured to define the access rights 230E. As such, the serial number, medium information and access rights may be co-located or they may be located in different portions of the image.

Similarly, not all portions of the image must be used. In fact, only a portion of the image may be used to determine the access rights. Similarly, different portions of the image may be used for different instances of the medium 110. For example, the access rights for a first user may be found in the upper left-hand corner, whereas, for the same content on a second medium, the access rights may reside in the lower right-hand corner.

The location of the access rights in the out-of-band token does not necessarily need to be specified in the same portion in advance. For example, in FIG. 2F, image 200F illustrates how a master location located on an image indicates where the user access rights are located in that image. For example, in image 200F, master location 210F indicates that regions 220F, 230F, and 240F should be used to determine the access rights. The master location may be located in a different portion of the image. For example, in one image, the master location may be located in the lower left-hand corner whereas, in another image for the same content, the master location may be located in the upper right-hand corner. The access rights may be located in randomly-selected locations from within the image.

Although several out-of-band tokens are shown, the out-of-band tokens are not limited to the out-of-band tokens shown in FIGS. 2A-2F. For example, other out-of-band tokens may include, but are not limited to, a promotional item also configured to act as an out-of-band token.

Figure 3:
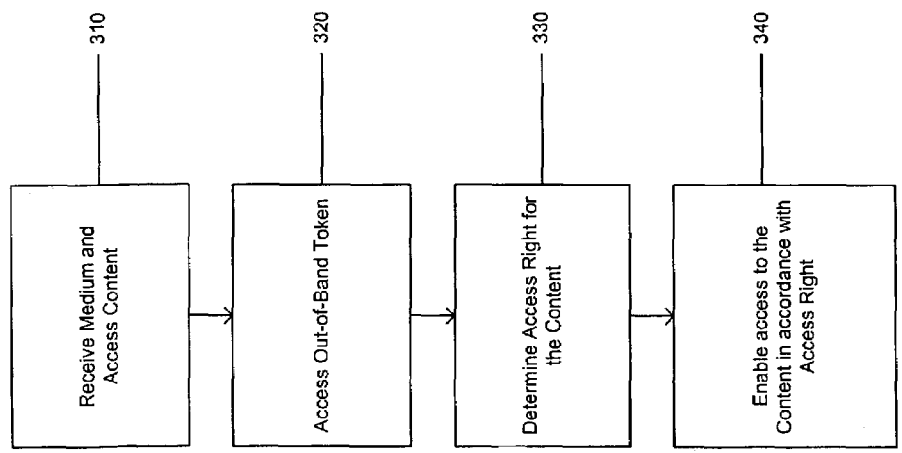
FIG. 3 is a flow chart of a procedure for accessing content leveraging an out-of-band token.

Referring to FIG. 3, a process 300 for administering access to content may be performed on systems that have been described previously (e.g., consumer appliance 120 using medium 110).

As shown, the medium is received and the content is accessed (step 310). Receiving the medium and accessing the content may include inserting a medium 110 into a consumer appliance 120. Accessing content also may include downloading content from a remote system. For example, a song may be downloaded from the Internet.

The out-of-band token is accessed (step 320). Generally, accessing the out-of-band token involves enabling the out-of-band token sensor 126 to read one or more out-of-band tokens 114. For example, after an optical disk has been inserted into a consumer appliance 120, the consumer appliance 120 may check the optical disk for an out-of-band token 114 residing on the surface of the optical disk and also may prompt the consumer to swipe an album cover underneath an additional out-of-band token sensor 126. Accessing an out-of-band token may involve more than one operation. For example, a consumer may be initially prompted for a first portion of the out-of-band token 114 and then subsequently prompted for another portion of the out-of-band token 114. More specifically, a first portion of the out-of-band token 114 may provide one indicia of access (e.g., the content serial number) and the second portion may be used to provide another indicia of access (e.g., the access rights).

With the content and the out-of-band token accessed, the access rights are determined (step 330). Generally, determining the access right for the content includes determining how a user may access the content. For example, permission to read, copy, and distribute the content may be indicated. Additionally, the access right may be set based on the device upon which the content is being accessed. For example, access rights may be limited to a particular consumer appliance, or a particular class of consumer appliances (e.g., a portable device).

Determining access rights for the content may include determining that no access rights have been identified. This may, in turn, trigger the application of one or more default rules based on user, device, and/or content criteria. For example, a default set of rules may be established and referenced for a particular user or class of users, a particular type of electronic content, or a particular class of consumer appliance. One such default rule may determine that the access rights are limited to read-only or some other predetermined permission level.

Determining the access rights also may include retrieving an access right data store of multiple access rights. This access right data store may be accessed through a communications network, such as the configuration where the access right data store resides on a remote host 150. Determining the access rights also may include determining precisely how the content may be accessed. For example, determining the access rights may include specifying a number of times the content may be accessed.

With the access rights determined, access to the content is enabled in accordance with the access rights (step 340). For example, a controller on a consumer appliance 120 may be directed to enable only read rights to content and to preclude the user from copying the content.

As an optional step (not shown), the out-of-band token may be registered. Registering the out-of-band token may enable the access rights to be modified. For example, until the out of the band token is registered, the access rights may be set to read-only permissions. However, upon determining that the user has registered the out-of-band token, the user may be given permission to make a predetermined number of copies of the electronic content.

Although the steps of procedure 300 appear in a serial order, they may be performed in parallel and/or in a different order. For example, although accessing content 112 is shown as being performed after accessing the out-of-band token 114, those access operations may be performed in reverse order or in parallel. Thus, an out-of-band token on an optical disk may be read before or after the optical disk is inserted in the consumer appliance 120 and content of the disk is accessed. Similarly, the optical disk may be inserted and then a cover image may be read to access the out-of-band token, or the cover image may be read concurrently with insertion of the optical disk in the consumer appliance 120.

Figure 4:
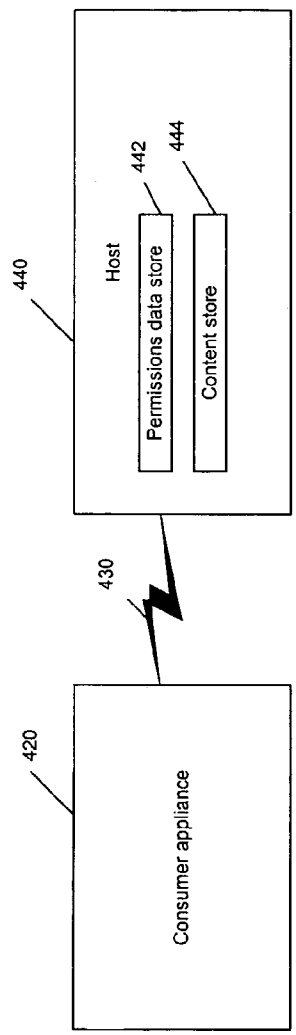
FIG. 4 is a block diagram of a communications system that includes a media player configured to access a host.

Referring to FIG. 4, an exemplary communications system 400 includes a media player 420 configured to access a remote data store 440 using a communications line 430. Generally, the consumer appliance 420 corresponds to the consumer appliance 120 described previously with respect to FIGS. 1-3. However, the consumer appliance 420 of FIG. 4 includes a network device configured to use the communications link 430 to determine access rights and/or retrieve content from the remote data store 440.

The communications link 430 typically includes a delivery network making a direct or indirect communication between the consumer appliance 420 and the host 440, irrespective of physical separation. Examples of a communications link 430 include the Internet, the World Wide Web, WANs ("Wide Area Networks"), LANs ("Local Area Networks"), analog or digital wired and wireless telephone networks (e.g., PSTN ("Public Switched Telephone Network"), ISDN ("Integrated Services Digital Network"), and xDSL ("any type of Digital Subscriber Loop"), radio, television, cable, satellite, and/or any other delivery mechanism for carrying data. The communications link 430 may include communication pathways that enable communications through the two or more delivery networks. Each of the communication pathways may include, for example, a wired, wireless, cable or satellite communication pathway.

The host 440 is generally capable of executing instructions under the command of a host controller (not shown). The host 440 may include one or more hardware components and/or software components. An example of a host 440 is a general-purpose computer (e.g., a personal computer) capable of responding to and executing instructions in a defined manner. Other examples include a special-purpose computer, a workstation, a server, a device, a component, other physical or virtual equipment, or some combination thereof capable of responding to and executing instructions.

The controller is a software application loaded on the host 440 for commanding and directing communications with the consumer appliance 420. Other examples include a program, a piece of code, an instruction, a device, a computer, a computer system, or a combination thereof, for independently or collectively instructing the consumer appliance 420 or the host 440 to interact and operate as described. The consumer appliance 420 and the host 440 may be embodied permanently or temporarily in any type of machine, component, physical or virtual equipment, storage medium, or propagated signal capable of providing instructions to the consumer appliance 420 or the host 440.

The host includes a permissions data store 442 and a content store 444. The permissions data store 442 includes a program, an application or a device configured to provide security, digital rights management, and/or authentication services for the host 440. For example, the permissions data store 442 may include a listing of serial numbers and associated out-of-band tokens. Alternatively, the permissions data store 442 may include listings of user identification information and content that the user is allowed to access.

Typically, the content store 444 enables the consumer appliance 420 to access online content. Other services provided as part of the content store may include programs that aid in content selections, and e-commerce programs that enable access rights to be purchased or acquired. In one example, the content store 444 enables a consumer to find electronic content produced by the same artist. In another example, the content store enables the consumer to purchase the access rights.

Figure 5:
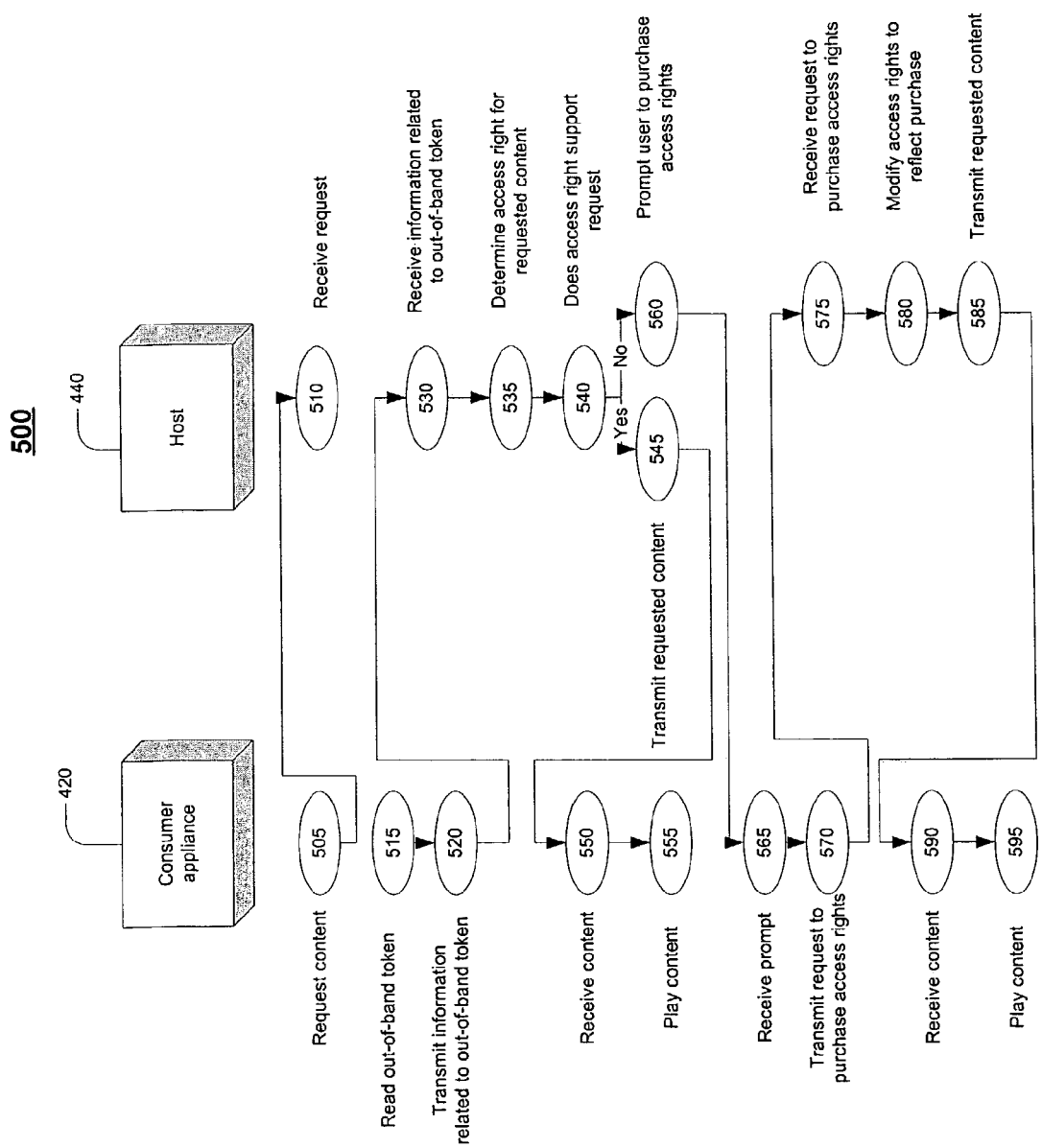
FIG. 5 is a flow chart of a process implemented by a media player configured to access a host.

FIG. 5 illustrates an exemplary flow chart 500 of a consumer appliance configured to access a host. Generally, the consumer appliance 420 and the host 440 correspond to the consumer appliances 120 and 420 described previously with respect to FIGS. 1-4 and the host 440 described with respect to FIG. 4.

Initially, the consumer appliance 420 requests content (step 505). The requested content may reside locally on the consumer appliance 420 (e.g., on an optical disk in an optical disk player), or the requested content may reside on a host. The host 440 receives the request (step 510). The consumer appliance 420 then reads the out-of-band token (step 515). Reading the out-of-band token may include using a card reader to read a card that has been purchased with access rights. The consumer appliance 420 transmits information related to the out-of-band token (step 520). Transmitting information related to the out-of-band token may include transmitting information that enables an access right to be determined. For example, the out-of-band token may include an image written on a card. The image may be read to determine a serial number. This serial number may be used as a reference to determine the access rights.

The host 440 receives the information related to the out-of-band token (step 530) and uses that information to determine the access rights (step 535). Determining the access rights may include referencing a user's permissions residing on a permissions store 442. For example, a registered user may be given a set of permissions for a set of content (e.g., the user may be allowed to copy a first piece of content). Alternatively, the access rights may be associated with a particular consumer appliance. For example, access to some content may be determined based on the identity of the consumer appliance being used to access the content.

The host 440 determines whether the access rights support the request for content (step 540). Determining whether the access rights support the request for content includes determining whether the permissions related to the out-of-band token allow for the content to be accessed in the requested manner. If the access rights supports the requested access, the host 440 transmits the requested content (step 545). The consumer appliance 420 then receives the content (step 550) and plays the content (step 555).

When the access rights do not support the request, the host 440 is configured to enable the user to acquire the access rights. For example, the host may prompt the user to purchase access rights (step 560). The user may receive the prompt (step 565). Receiving the prompt may include generating a display on the consumer appliance 420 that enables the user to acquire the content. For example, the user may have a payment link established so that the user may conveniently purchase access rights by reading an out-of-band token that identifies the user. In another example, the consumer appliance may prompt the user for payment information.

If the user elects to purchase access rights for the requested content, the consumer appliance 420 transmits the request to purchase access rights (step 570). The host 440 receives the request to purchase access rights (step 575). The host 440 then executes a transaction so that the access rights may be purchased (e.g., a credit card is charged) and modifies the access rights to reflect the purchase (step 580). Modifying the access rights to reflect the purchase may include adjusting a user record in a permissions data store 442 so that the user may access the requested content. Modifying the access rights also may include adjusting an access right that is locally maintained on the consumer appliance. For example, an optical disk player may have local permissions. Modifying the access rights may adjust the local permissions to enable access to the content without requiring the consumer appliance to subsequently access the host 440.

Where the content does not reside on the consumer appliance 420, the host 440 may transmit the content to the consumer appliance 420 (step 585). Transmitting the content to the consumer appliance 420 may include enabling the consumer appliance to download a particular file with the requested content. The consumer appliance receives the content (step 590) and plays the content (step 595).

Figure 6:
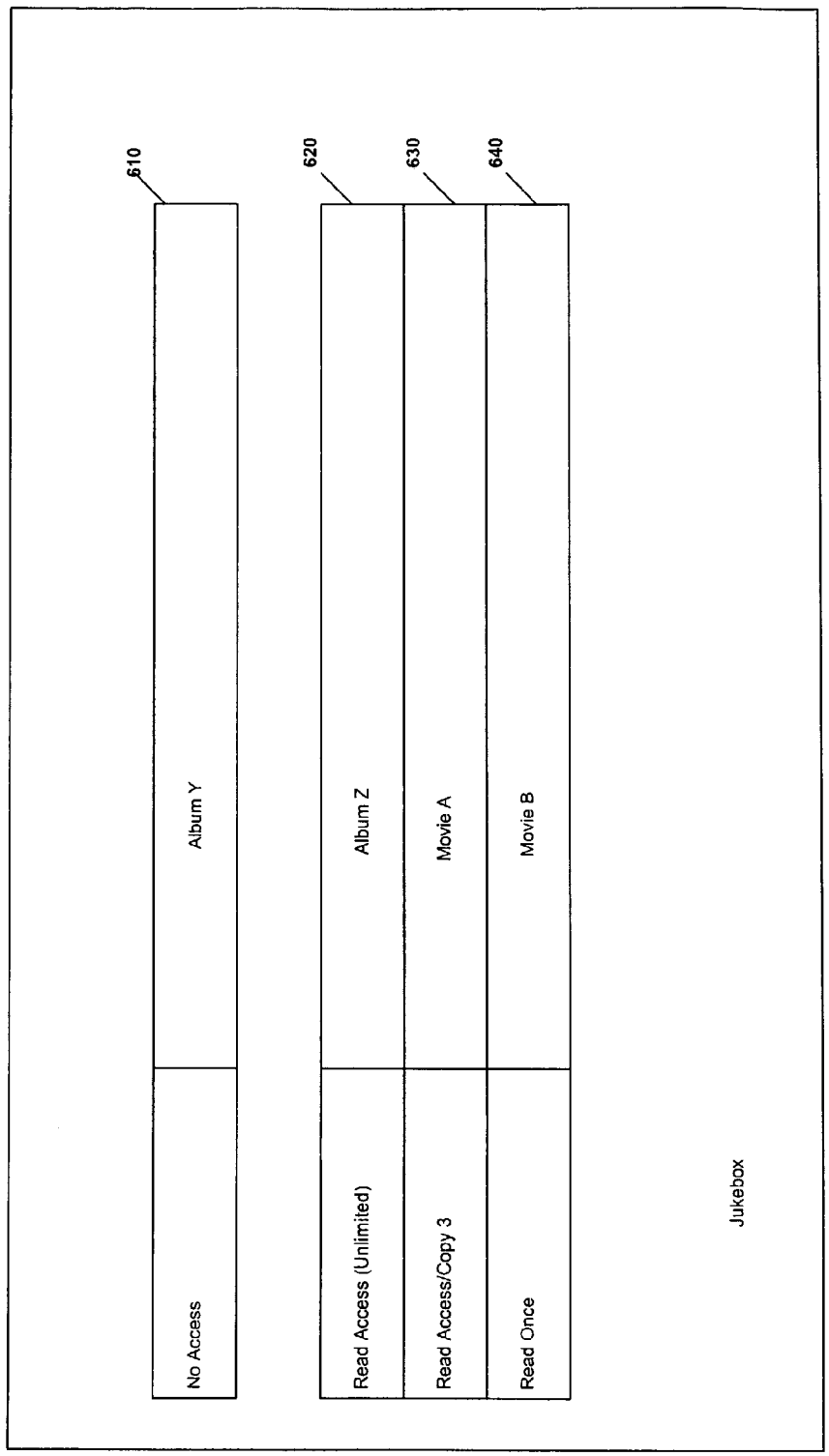
FIG. 6 is a block diagram of a jukebox configured to act as a content access system.

FIG. 6 shows an exemplary list of access rights for a jukebox system 600. In jukebox 600, a content piece is selected along with access rights for the content. Generally, the jukebox 600 relates to the content access system 100 described in FIG. 1. However, FIG. 6 illustrates how the consumer appliance 120 may function as a jukebox. Typically, a jukebox 600 includes more than one content piece that may be selected, with multiple content pieces residing in a common location or consumer appliance.

In the example shown in FIG. 6, the jukebox 600 includes content that may be selectively accessible. Jukebox 600 includes records 610-640, with each record describing a piece of content and the related access right. In jukebox 600, record 610 describes a stored CD Y, for which the illustrated user has no access privileges, but for which the user may gain access privileges by purchasing use rights that are made available through use of an out-of-band token that enables access to the content. For example, a user may purchase a card 230A that unlocks CD Y for the holder of the card 230A. The jukebox 600 may include an out-of-band token sensor 126 configured to read the card 230A.

In jukebox 600, record 620 indicates that the user is given unlimited read access to CD Z. For example, the illustrated user may have purchased the CD and, by virtue of the purchase, may have unlimited listening rights to the CD. The access rights regulating unlimited read access to the CD may have been established by the user using out-of-band token 114 to unlock the unlimited access rights to CD Z.

In contrast to the unlimited access rights to CD Z, for Movie A, record 630 indicates that the user has read access rights and may make a limited number of copies of Movie A.

Finally, record 640 indicates that the user has read-once access rights for Movie B. This may be because, for example, Movie B is being distributed in a promotion and the user has received read once access rights in the course of participating in the promotion. For example, a marketing company may distribute promotional items in a magazine. The magazine promotion may include the card 230A, which may be read by the out-of-band token sensor 126 residing in jukebox 300. Upon accessing Movie B once, the user's access rights to Movie B are terminated.

The jukebox 600 may use a host-based system to track the number of copies or viewings. For example, a user may register the user's instance of the content on a host-based registry. Upon copying the content, a counter may be decremented to reflect that the user has consumed one right to copy or view. When the counter indicates that no more access rights exist, permission to perform the copying or viewing may be denied.

Figure 7:
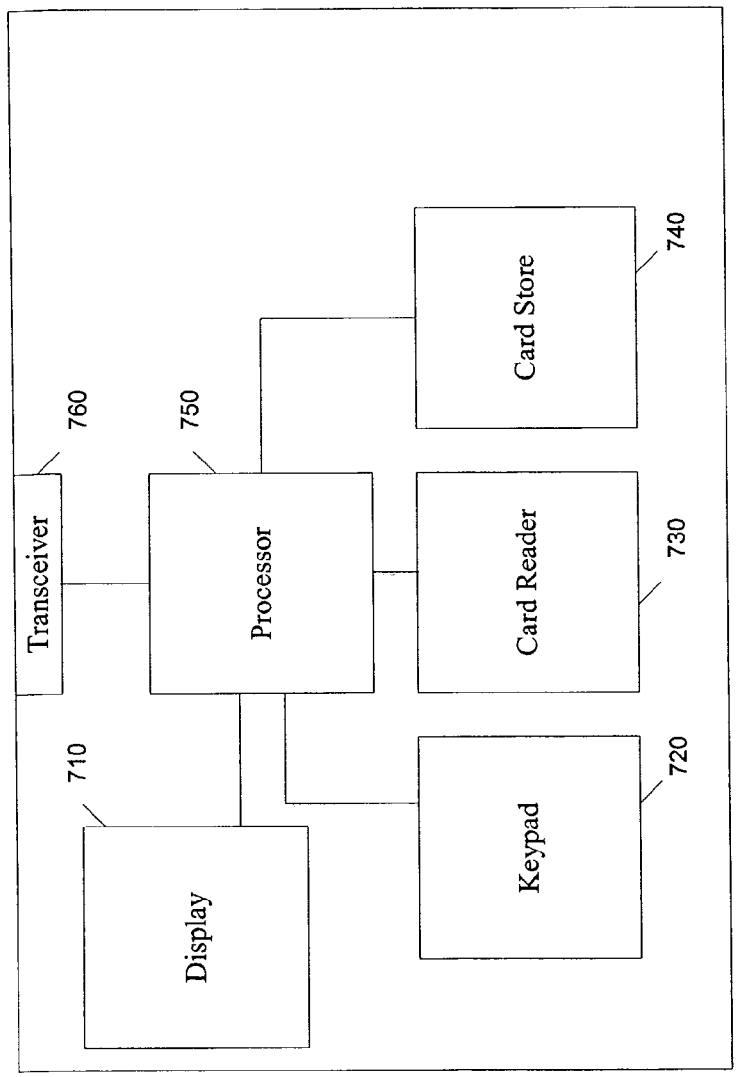
FIG. 7 is a block diagram of an electronic loose-leaf configured to interface with a media player.

Referring to FIG. 7, an electronic loose-leaf 700 is configured to read cards related to the electronic content being accessed by a media player. The electronic loose-leaf 700 may access an out-of-band token residing in the card and interface with a media player to determine access rights and enable access to the electronic content. In some implementations, the electronic loose-leaf 700 may include a book, folder, or organizer that stores optical disks not being used and also acts as a remote control to operate a media player. A user may insert a card associated with an optical disk into a card reader. The user then may insert the associated optical disk in the media player. If the card relates to the optical disk in the media player, the user may be granted access based on that relationship.

The electronic loose-leaf 700 includes a display 710, a keypad 720, a card reader 730, a card store 740, a processor 750, and a transceiver 760. The electronic loose-leaf 700 illustrates exemplary components that may be incorporated into the electronic loose-leaf 700. Other electronic loose-leafs may include different systems.

Generally, the display 710 includes a device configured to generate visual information related to the electronic content being accessed. The display 710 may include a LCD ("Liquid Crystal Display") or other display device. The display 710 may include a reconfigurable or static display. For example, a reconfigurable display may generate customizable icons for the user. The customizable icons may be related to the user's preferences or to the electronic content being accessed. In contrast, a static display includes icons that that are manufactured into the display. For example, an icon featuring a PLAY button may be written into a certain portion of the display using a right facing triangle.

The keypad 720 includes one or more buttons that enable a user to enter a selection to control a media player to access electronic content. Although a keypad has been described, other input devices that may be used may include, but are not limited to, a LCD display, a track ball, a joystick, a mouse, a toggle, a button, and/or another device configured to enable a user to input a selection.

The card reader 730 includes a sensor configured to read a card describing content that is accessed. For example, the card may include an out-of-band token that is used to determine access rights. The card reader 730 may include an image sensor configured to read an image residing in or on the card, and may read the image on the card and extract a handler that may be used to determine an access right. Alternatively, the handler may be used to generate a display for the user. In some cases, the handler includes an access right. In other cases, the handler serves as a reference that may be used to determine an access right. For example, the handler may be exchanged with the media player to determine if a serial number in the handler relates to an optical disk being played.

The card store 740 includes one or more jackets configured to store cards for subsequent access. For example, when a card is not secured in the card reader 730, the card store 740 may be used to prevent the cards from being damaged. In one example, the card store 740 includes a jacket configured to store both an optical disk and the card. The jacket may prevent the optical disk and the card from being bent, scratched, or degraded through, for example, accidental exposure to particulates or liquid.

The card store 740 may include a logical device configured to track cards that are secured in the card store 740. For example, the card store 740 may include a probe configured to read a serial number from the card as the card is stored. The probe may be configured to read a static memory device embedded in the card. This static memory device may be used to verify that the card controls or remains in proximity with the electronic loose-leaf 700. For example, so long as the electronic loose-leaf 700 is able to verify that the card resides in card store 740, the electronic loose-leaf 700 may control the media player, even when the card does not reside in the card reader 730. The electronic loose-leaf 700 may accommodate the time required to transfer a card from a card reader 730 to the card store 740. For example, the electronic loose-leaf 700 may allow the user to take sixty seconds to transfer the card from the card reader 730 to the card store 740. This may allow the user to enjoy the art and information printed on the card (e.g., lyrics), which also may double as the repository of information read by the card reader 730.

Even though the card may use a band accessed by the card store 740, the information read by the card reader 730 need not reside in the same band as one used by a card store. Rather, the card store 740 illustrates how the card may be tracked even when the card does not reside in the card reader 730. Thus, the card could include an image read by the card reader 730 and logic read by the card store 740.

The processor 750 includes a logical controller configured to manage the cards and related access rights for content being accessed. The processor 750 also may be configured to act as a remote control for a media player. The processor 750 may include a specialized or general-purpose processor.

The processor 750 is configured to act as a controller for other devices in the electronic loose-leaf 700. For example, the processor 750 is configured to operate code segments that generate output on the display 710, receive inputs on the keypad 720, receive a handler on the card reader 730, and communicate data using the transceiver 760.

The transceiver 760 includes a wireless transmitter and/or a receiver configured to exchange wireless data with the media player. The transceiver 760 may operate using optical, infrared, or other wireless frequencies. Generally, the transceiver 760 receives one or more instructions that have been routed through the processor 760. For example, the transceiver may receive information generated by the card reader 730 that has been encapsulated by the processor 750 for transmission to the media player.

Although implementations of the electronic loose-leaf 700 have been described as a complex computing device with a display 710, a keypad 720, a card reader 730, a card store 740, a processor 750, and a transceiver 760, other implementations may include a simplified special purpose device configured to exchange card information with a media player. In one example, the constituent components described previously interface directly through interconnect logic to the transceiver 760 so that the media player may process and receive a user's inputs. In another example, the electronic loose-leaf 700 may not include all of the components described previously. One such electronic loose-leaf may include a remote control with several input buttons, a card reader, and a transceiver.

The electronic loose-leaf 700 is not limited to determining access rights. For example, electronic loose-leaf 700 may use the card to present media-specific information in the display.

Figure 8:
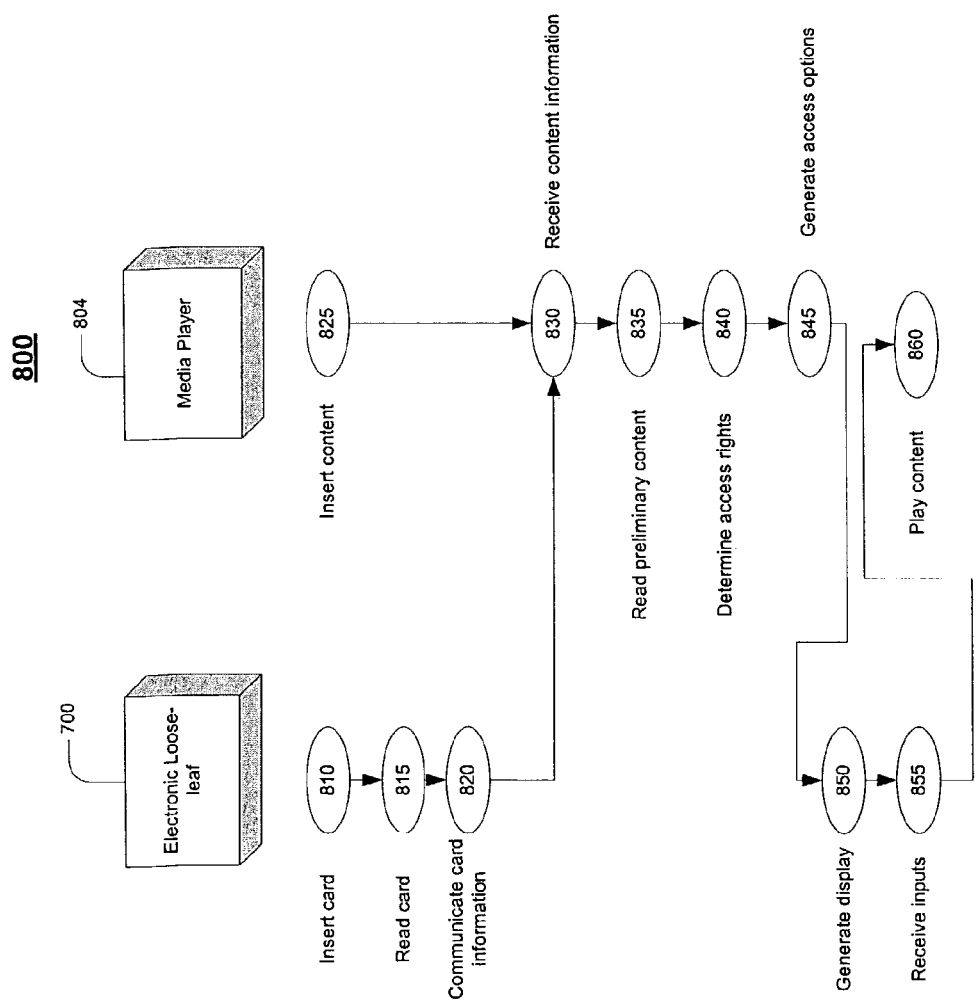
FIG. 8 is a flow chart of a process in which an electronic loose-leaf interfaces with a media player.

Referring to FIG. 8, a process 800 illustrates how the electronic loose-leaf 700 may interface with a media player 804. In general, the media player 804 corresponds to the consumer appliance described previously with respect to FIGS. 1-6.

Initially, a consumer inserts a card in the electronic loose-leaf (step 810). Inserting a card may include removing a card from storage (e.g., card store 740) and placing the card in the reader 730. The electronic loose-leaf 700 reads the card (step 815). Reading the card may include using an optical sensor in the card reader 730 and determining optical values located at certain portions of the card. Reading the card generates a handler, or snapshot of information on the card. In some implementations, the handler includes the access rights for the content being accessed. However, in other examples, the handler may be used to generate a display on the display 710 of the electronic loose-leaf 700.

As the consumer is inserting the card into the electronic loose-leaf 700, the consumer also may insert content into the media player 804 (step 825). In one instance, the content is inserted before the card is read. Alternatively, the content may be inserted after the card is read.

In any event, after the card is read and the handler is determined, the electronic loose-leaf 700 communicates the card information to the media player 804 (step 820). The media player receives the content information (step 830).

When the electronic loose-leaf 700 is used to determine access rights, the electronic loose-leaf 700 may be used to administer an access control system. When the electronic loose-leaf 700 is communicating other information, the information may be used to control use of the content. For example, a particular track on a particular album may be requested.

The media player 804 then reads preliminary content (step 835). The media player 804 may read preliminary content to verify that the instructions received correlate to the optical disk in the media player. The media player then determines whether the access rights that were read from the card are authorized to access the media (step 840). For example, the serial number associated with the card may not match the serial number associated with the album. In response, the media player 804 may act to limit access options.

The card may include promotional material that has been printed in a magazine. The promotional material may include access rights for a limited number of reads. Determining the access rights may include determining that the consumer has exhausted the promotional access rights.

The media player 804 generates one or more access options (step 845). The access rights to the content may be limited. For example, if the electronic loose-leaf 700 and/or the media player 804 determines that the access request conforms to a pirated profile, access to the content may be denied. Alternatively, the media player may be allowed to play but not copy the content.

Generating the access options may include presenting the user with the ability to purchase additional access rights. For example, the media player 804 may work with the electronic loose-leaf to generate a display descriptive of additional opportunities (step 850). When the user exhausts a license for three copies after having copied the content to a home theater system, a car audio system, and a mobile stereo system, the display may generate an e-commerce ticket enabling the user to secure an additional copy/license for another device, such as, for example, a personal computer, a boat, or a second home.

The electronic loose-leaf 700 may execute the transaction. For example, if the user is associated with a particular billing method, the electronic loose-leaf may generate the communications that appropriately debit the user's account and upload the content and/or license. The billing method need not include a direct cost approach (i.e., the billing method need not charge the user for the license). Billing methods may include indirect licensing techniques, such as a enabling the user to license and/or download a specified number of items per month.

In any event, regardless of whether the user is selecting content to access or engaging in a licensing/download transaction, the electronic loose-leaf receives the user's inputs (step 855). For instance, when the user elects to play track 7 on CD Y, the electronic loose-leaf transmits the user's inputs to the media player 804. The media player then plays the content (step 860).

The media player need not receive removable media such as an optical disk. If the media player 804 acts as a repository of multiple selections of content, the electronic loose-leaf may act as a gateway to the repository. For instance, access to the stored content may be regulated by relating access to the stored content to a card in the electronic loose-leaf 700. Accordingly, the user need not acquire the electronic content itself. For instance, a user may visit a retail outlet to purchase a card used to unlock content stored on or downloadable to a media player. The retail outlet may manage access to cards (e.g., inventory) and relate the cards to a user identity or profile. For example, the retail outlet may provide a user with a promotional card based on the user's online profile.

Other implementations are within the scope of the following claims. For example, the electronic loose-leaf and the media player may distribute the operations across one or more systems and/or proxies. In another example, the content may be accessed on a first device, while the out-of-band token is accessed on another device. A consumer appliance that reads an optical disk may be used to read the content while an optical sensor attached to a personal computer may access the out-of-band token. The content then may interface with the out-of-band token sensor to determine the access rights for the content.

Although the electronic loose-leaf is described as interfacing with a card, the electronic loose-leaf may interface with other structures. For example, three-dimensional tokens, including cylindrical, ornamental, and/or matchbox structures may be used.

What is claimed is:

1. An electronic loose-leaf remote control for enabling access to selectively accessible content at a media player, the electronic loose-leaf remote control comprising:
   a token reader structured and arranged to read an out-of-band token that is secured by a token source and that is associated with a particular instance of selectively accessible content that is derived from a source other than the token source;
   a processor structured and arranged to:
      determine an electronic handler from the out-of-band token, the electronic handler being related to access rights for regulating access to the instance of the selectively accessible content at the media player and;
      derive, from the electronic handler, an access right that is configured to regulate access to the instance of selectively accessible content at the media player; and
   a transceiver structured and arranged to exchange the access right with the media player to enable access to the instance of selectively accessible content.

2. The electronic loose-leaf remote control of claim 1 further comprising a token store structured and arranged to secure an out-of-band token not residing in the token reader, wherein the token store is structured and arranged to identify an out-of-band token that is secured in the token store.

3. The electronic loose-leaf remote control of claim 2 further comprising means for securing an out-of-band token not residing in the token reader, wherein the out-of-band token is a passive out-of-band token that does not require electronic interrogation.

4. The electronic loose-leaf remote control of claim 2 wherein the token store further comprises a token tracker structured and arranged to track an out-of-band token not residing in the token reader based on a proximity of the out-of-band token to the electronic loose-leaf remote control.

5. The electronic loose-leaf remote control of claim 2 wherein the token store further comprises a token tracker structured and arranged to track an out-of-band token not residing in the token reader based on a presence of the out-of-band token in the token store.

6. The electronic loose-leaf remote control of claim 1 further comprising a display structured and arranged to generate perceivable output related to the electronic content.

7. The electronic loose-leaf remote control of claim 1 further comprising an input device structured and arranged to enable a consumer to interface with a media player using the out-of-band token.

8. The electronic loose-leaf remote control of claim 7 wherein the input device includes a keypad.

9. The electronic loose-leaf remote control of claim 7 wherein the input device comprises a reconfigurable display structured and arranged to vary an available input option based on the handler.

10. The electronic loose-leaf remote control of claim 1 wherein the token reader comprises a card reader and the out-of-band token comprises a token printed on a card.

11. The electronic loose-leaf remote control of claim 1, wherein the out-of-band token is an active out-of-band token that requires electronic interrogation.

12. The electronic loose-leaf remote control of claim 1 wherein the electronic loose-leaf remote control is further structured and arranged enable access to selectively accessible content from a media player based on a presence of the out-of-band token in the token store.

13. The electronic loose-leaf remote control of claim 1 wherein the electronic loose-leaf remote control is further structured and arranged enable access to selectively accessible content from a media player based on a proximity of the out-of-band token to the electronic loose-leaf remote control.

14. The electronic loose-leaf remote control of claim 1 wherein the token store includes a jacket structured and arranged to store out-of-band tokens.

15. The electronic loose-leaf remote control of claim 1 wherein content information includes access rights to the selectively accessible content.

16. The electronic loose-leaf remote control of claim 1 wherein content information includes an identifier that serves as a reference for determining access rights to the selectively accessible content.

17. A method of using an electronic loose-leaf remote control for enabling access to selectively accessible content from a media player, the method comprising:
   receiving, at the electronic loose-leaf remote control, an instruction from a user to access selectively accessible content at a media player;
   reading, using a token reader, an out-of-band token that is secured by a token source and that is associated with a particular instance of selectively accessible content that is derived from a source other than the token source;
   identifying an electronic handler from the out-of-band token, the electronic handler being relating to access rights for regulating access to the instance of the selectively accessible content at the media player;
   deriving, from the electronic handler, an access right that is configured to regulate access to the instance of selectively accessible content at the media player; and
   exchanging the access right with the media player to enable access to the instance of selectively accessible content.

18. The method of claim 17 further comprising securing the out-of-band token in a token store when the out-of-band token is removed from a token reader, wherein securing the out-of-band token includes determining that the out-of-band token is secured in an automated manner.

19. The method of claim 17 further comprising generating perceivable output related to the electronic content.

20. The method of claim 19 wherein generating perceivable output includes enabling a consumer to operate the media player using the system reading the out-of-band token.

21. The method of claim 19 wherein generating perceivable output includes generating a reconfigurable display that varies with the out-of-band token that is read.

22. The method of claim 19 wherein generating perceivable output includes generating a reconfigurable display related to an access right associated with the out-of-band token that is read.

23. The method of claim 17 further comprising associating the out-of-band token with a particular instance of content.

24. The method of claim 17 wherein exchanging the content information with the media player includes transmitting access rights to the selectively accessible content to the media player.

25. The method of claim 17 wherein exchanging the content information with the media player includes transmitting, to the media player, an identifier that serves as a reference to the media player for determining access rights to the selectively accessible content.

26. An electronic loose-leaf remote control for enabling access to content at a media player, the electronic loose-leaf remote control comprising:

means for receiving an instruction from a user to access selectively accessible content from a media player;

means for reading an out-of-band token that is secured by a token source and that is associated with a particular instance of selectively accessible content that is derived from a source other than the token source;

means for identifying an electronic handler from the out-of-band token, the electronic handler being relating to access rights for regulating access to the instance of the selectively accessible content at the media player;

means for deriving, from the electronic handler, an access right that is configured to regulate access to the instance of selectively accessible content at the media player; and means for exchanging the access right with a remote media player to enable access to the instance of selectively accessible content.

27. A method of using an electronic loose-leaf remote control for enabling access to selectively accessible content at a media player, the method comprising:

receiving, at the electronic loose-leaf remote control, an instruction from a user to reproduce selectively accessible content from a content store by a media player;

reading, using a token reader, a passive out-of-band token that does not require electronic interrogation, wherein the passive out-of-band token is associated with a particular instance of selectively accessible content and is not part of the content store;

identifying an electronic handler from the out-of-band token, the electronic handler being relating to access rights for regulating access to the instance of the selectively accessible content at the media player;

deriving, from the electronic handler, an access right that is configured to regulate access to the instance of selectively accessible content at the media player; and exchanging the access right with the media player to enable access to the instance of selectively accessible content.

\* \* \* \* \*